Figure 13:
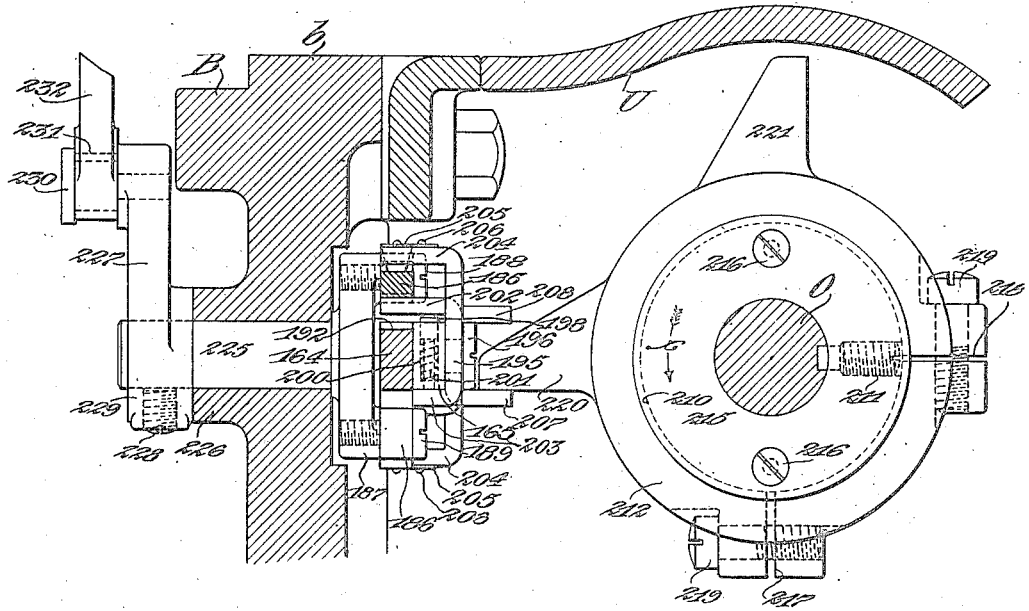

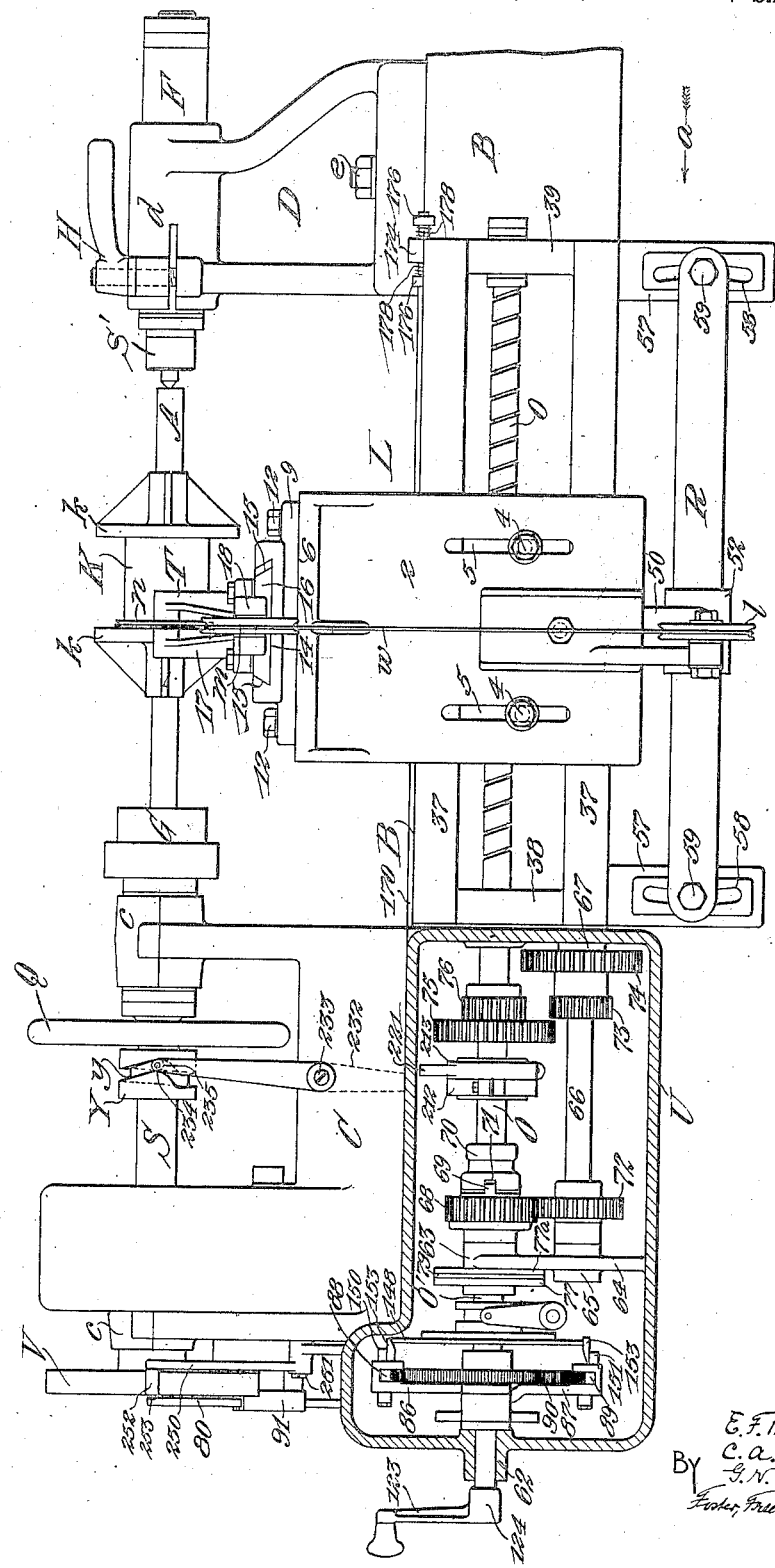

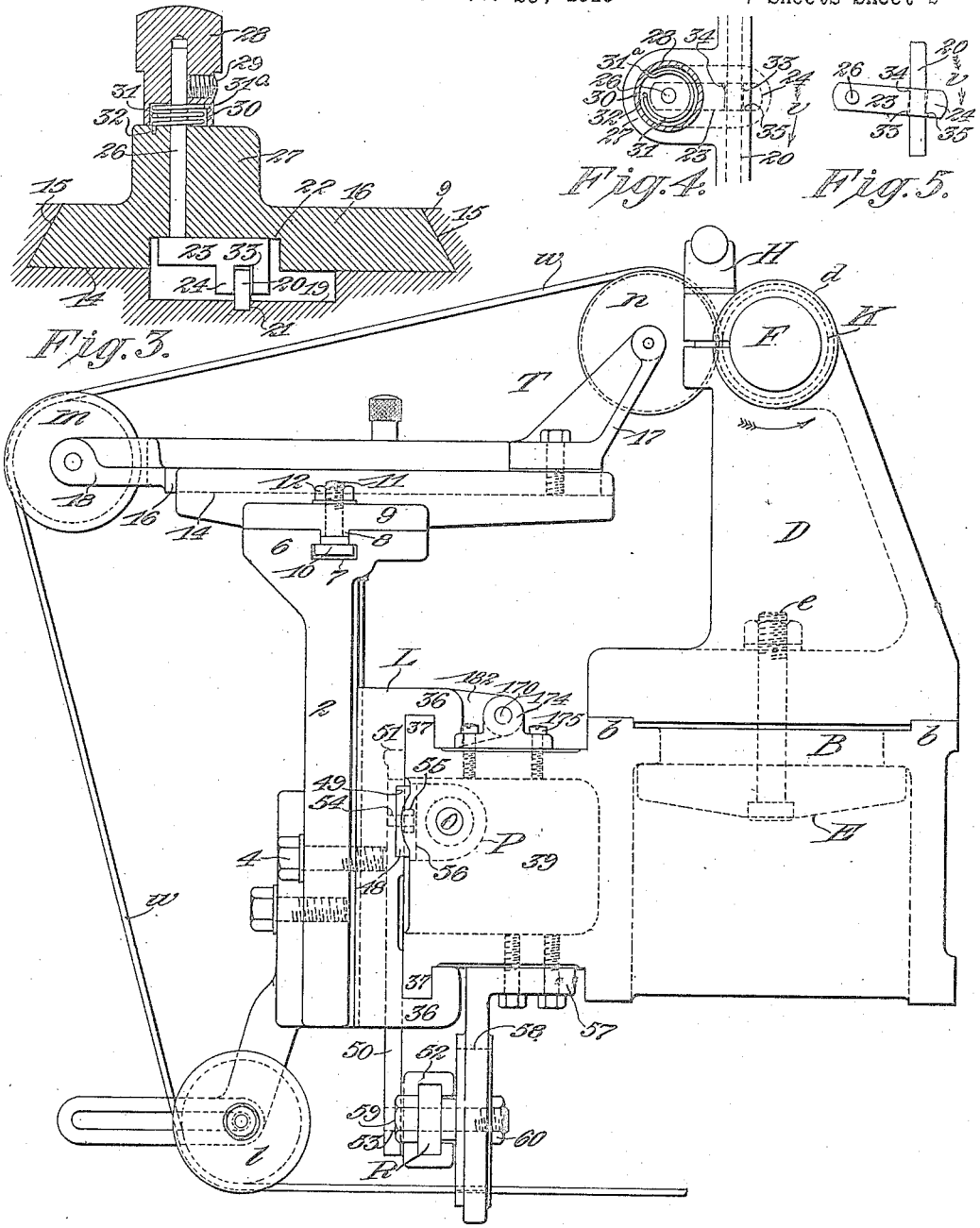

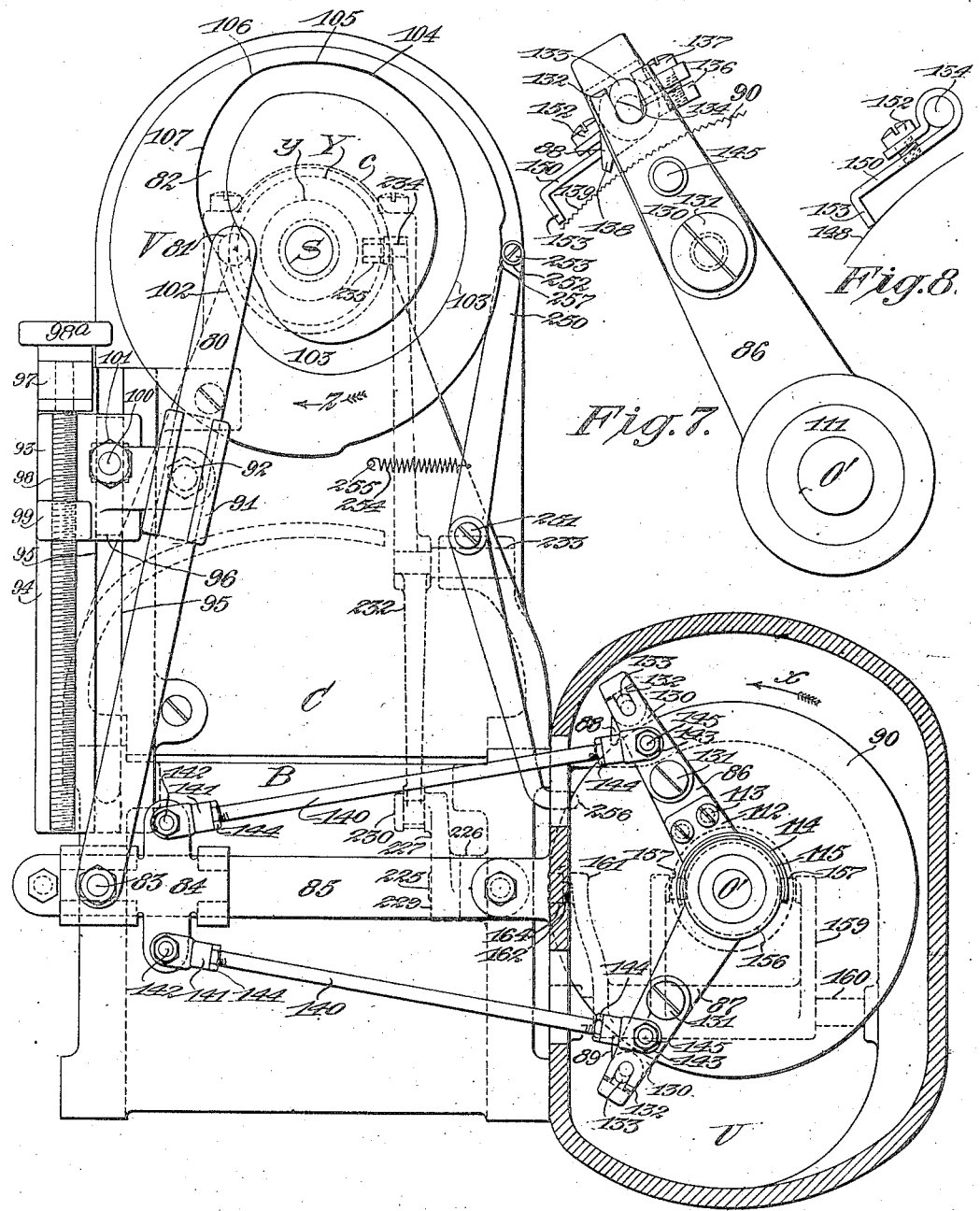

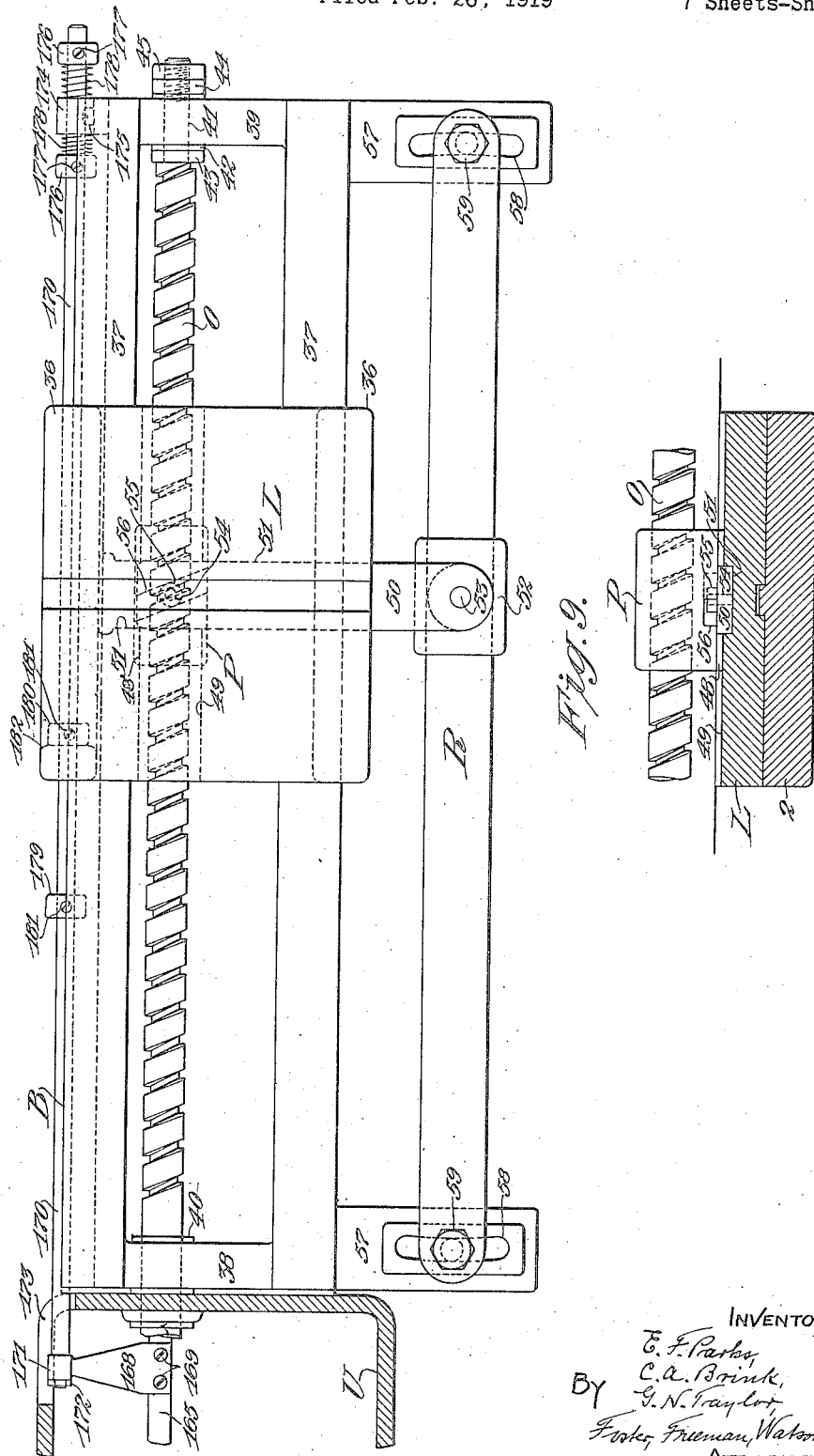

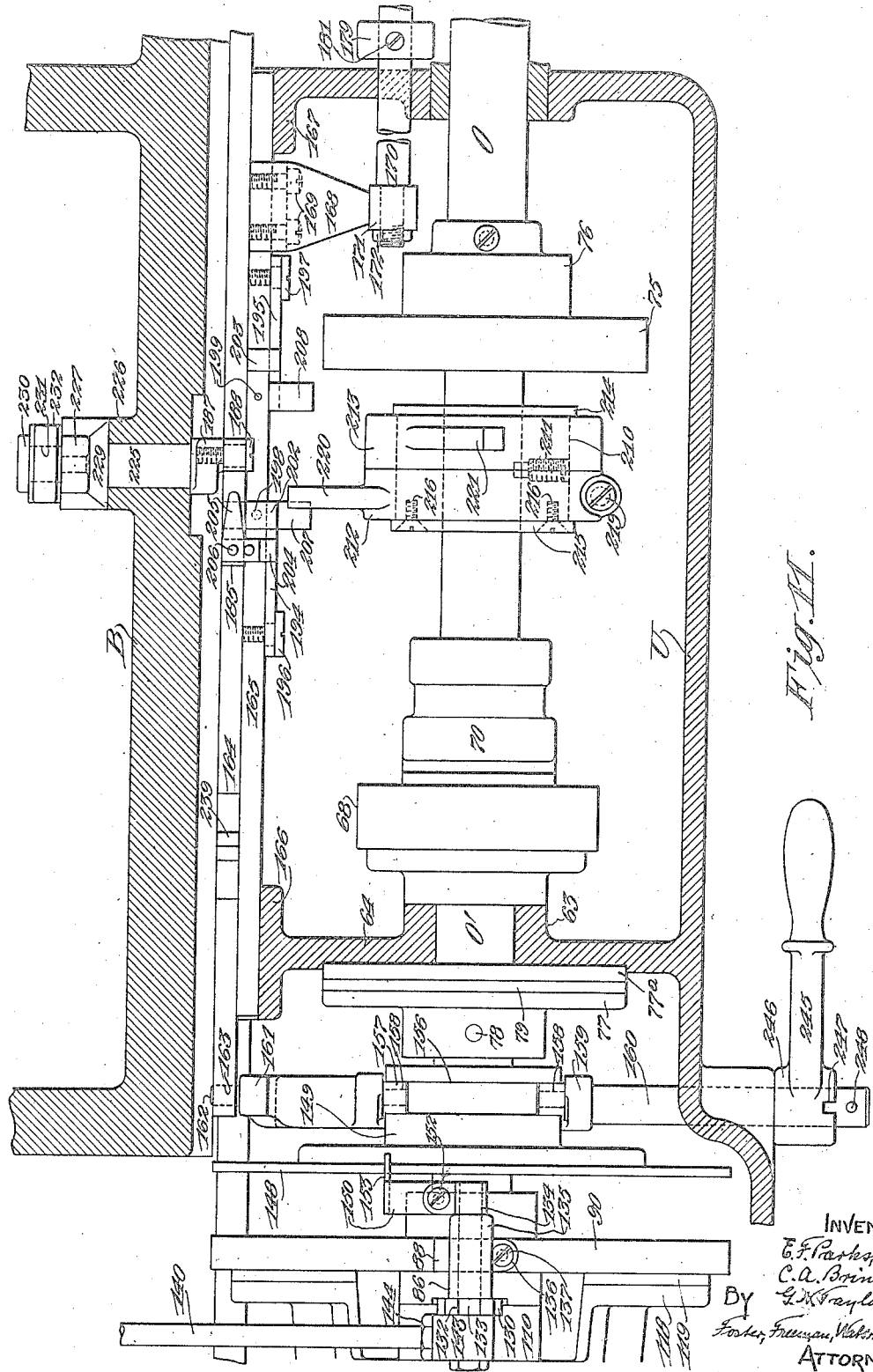

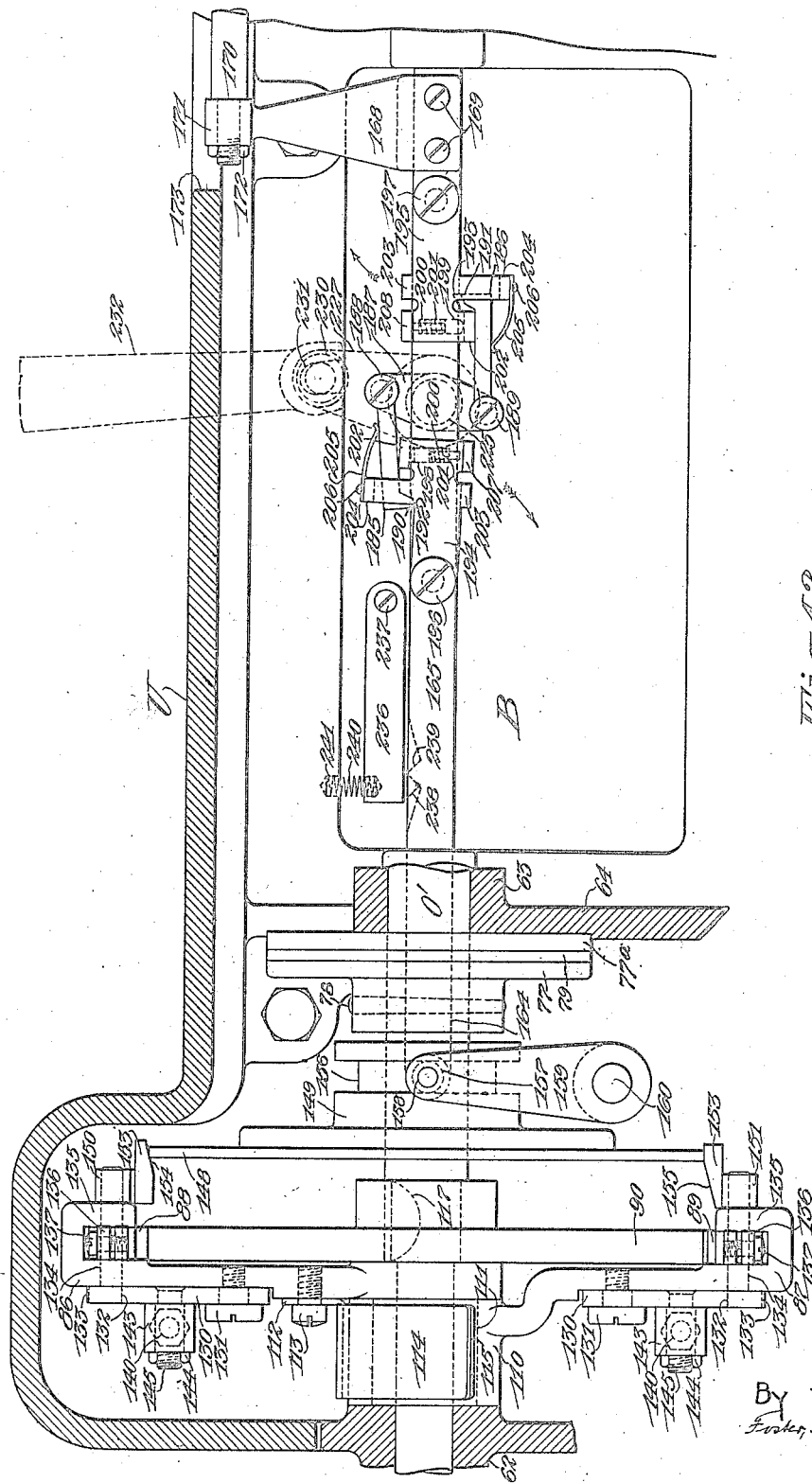

Patented Aug. 7, 1923.

1,463,834

UNITED STATES PATENT OFFICE.

EDWARD F. PARKS AND CARL A. BRINK, OF PROVIDENCE, AND GEORGE N. TAYLOR, OF EAST PROVIDENCE, RHODE ISLAND, ASSIGNORS, BY MESNE ASSIGNMENTS, TO THE NEW ENGLAND TRUST COMPANY, TRUSTEE, A CORPORATION OF MASSACHUSETTS.

WINDING MACHINE.

Application filed February 26, 1919. Serial No. 279,255.

*To all whom it may concern:*

Be it known that we, EDWARD F. PARKS and CARL A. BRINK, of Providence, and GEORGE N. TAYLOR, of East Providence, respectively, in the county of Providence and State of Rhode Island, citizens of the United States, have invented certain new and useful Improvements in Winding Machines, of which the following is a specification.

Our invention relates to winding machines and particularly to machines for winding electrical coils. Our improvements are directed to the traverse-mechanism of the machine which imparts the feeding movement to the guide to deposit the strand of wire or other conductor in place on the coil; and the object of the improvement is to provide means for adjusting the extent of feed of the guide; for determining the point of reversal of its traverse; and for regulating and controlling its rate of movement with precision and accuracy.

The manner and means for carrying out these improvements and for providing other advantages in the method of operation of the machine are fully described in the following specification, illustrated by the accompanying drawings, in which like reference characters designate like parts.

In the drawings:—

Fig. 1 is a front elevation of the winding machine, giving a general view of the traverse-mechanism and illustrating its relation to the other parts of the apparatus;

Fig. 2, an enlarged, end view of the machine, looking in the direction indicated by the arrow *a*, Fig. 1, and showing the mounting for the traverse- or wire-guide.

Fig. 3, an enlarged, vertical, sectional view of the friction dogging-mechanism for the traverse-guide slide;

Fig. 4, a plan view in detail of the same;

Fig. 5, a similar, plan view showing the dogging-device in operative position;

Fig. 6, an enlarged, end view of the machine, looking in the direction opposite to that indicated by the arrow *a* in Fig. 1, and showing the driving-connections for the traverse-mechanism which operates the wire-guide;

Fig. 7, a still further enlarged, detail view of the ratchet-device for the traverse-operating means;

Fig. 8, another enlarged, detail view of the same;

Fig. 9, a front elevation of the traverse feed-screw and its connections;

Fig. 10, a plan view in detail of the same;

Fig. 11, an enlarged, plan view of the traverse-screw driving-means and reversing-devices;

Fig. 12, an enlarged, front elevation of the ratchet-mechanism and reversing-devices for the traverse-screw;

Fig. 13, an enlarged, end elevation of the reversing-means in detail; and

Figure 14:
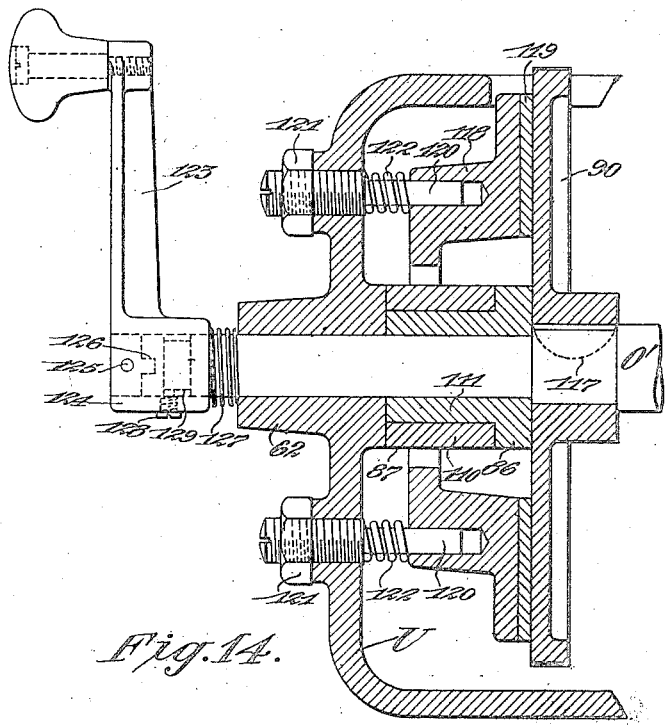

Fig. 14, a vertical, sectional view of the friction-brake for the ratchet-mechanism.

Referring first to Fig. 1, the winding machine is mounted on a horizontal bed or table B supported from legs or other suitable standards not herein shown. At the left-hand end of the bed B is a fixed headstock C, provided with suitable bearings *c*, *c* for the rotating winding-spindle S; while at the right is an adjustable tailstock D for supporting the outer end of the detachable winding-mandrel or arbor A. The tailstock D is adjustable longitudinally of the bed B on ways *b*, *b*, see Fig. 2, and is secured in position by means of a bolt *e* extending down through a cross-cleat or clamp E. Slidably mounted in a split-bearing *d* at the top of the tailstock D is a cylindrical barrel F which carries a freely rotatable live-spindle S'. The winding-arbor A is connected to the end of the driven spindle S by means of a suitable chuck G, while its opposite end is supported on the conical point of the live-spindle S'. The spindle S' may be withdrawn axially by sliding its barrel F in the tailstock D, to allow for the placing and removal of the arbor A, the barrel F being clamped in its bearing *d* by means of a hand-screw H extending through its split portion. The winding-mandrel or arbor A usually carries a former K which serves as the core for the windings laid thereon, and its barrel may be either cylindrical or polysided in accordance with the form of coil to be produced. For winding coils from relatively large wire, end-flanges *k*, *k* are generally employed to hold the wire turns or convolutions in place in the layers, these being detachably mounted on the arbor A, as shown in Fig. 1, to allow the completed coil to be removed therefrom.

The wire $w$ or other strand to be wound is fed to the winding-mandrel and traversed along the core K between the heads or end-flanges $k, k$ by means of a traversing guide T. The guide T comprises a slidable carriage L carrying means for mounting a series of grooved guide-wheels or pulleys $l, m, n$, as shown more particularly in Fig. 2. A vertical standard or bracket 2 is attached to the front of the carriage L by means of bolts 4 extending through slots 5, whereby it may be adjusted up and down thereon to set the guide-wheel $n$ in proper relation to the winding-mandrel A. The top of the bracket 2 is constructed with a horizontal table 6 formed with a longitudinal slot 7 adapted to receive a key or spline 8 on the under side of a horizontal plate 9. The slot 7 is of T-shape in cross-section to adapt it to receive the heads 10 of bolts 11 which extend up through the plate 9 with nuts 12 on their ends. Through this means the plate 9 may be adjusted along the top of the bracket 2 to set the parts of the traverse-guide T in proper position longitudinally of the winding-mandrel A. The plate 9 is constructed with a lateral guide-way 14, see Fig. 1, formed with beveled sides 15 to adapt it to receive a transverse slide 16 having correspondingly beveled edges. Mounted on the inner end of the slide 16 is a bracket or bearing 17 for the main guide-wheel $n$, while at the opposite end are suitable arms 18 between which is rotatably mounted the wheel or pulley $m$. The slide 16 is adapted to be slid toward the winding-mandrel A to adjust the guide-wheel $n$ with its periphery in close relation to the circumference of the core K on which the strand $w$ is to be laid, and as the winding increases in diameter with each successive layer of the coil the slide 16 moves back on the bracket 2. This movement of the slide 16 toward and away from the axis of the winding-mandrel is controlled by a dogging-mechanism which is illustrated in Figs. 3, 4 and 5, and is arranged to function in the manner as next explained:

Beneath the slide 16 is a rectangular slot 19 extending longitudinally of the guideway 14 in the plate 9, and at the center thereof is a key or spline 20 set in a narrower slot 21, see Fig. 3. On the under side of the slide 16 is a recess 22, in which is pivoted a dog-lever 23 formed with a forked end 24 embracing the sides of the key 20. The lever 23 is fast on the lower end of a vertical shaft 26 extending up through a hub or boss 27 on the slide 16, and at the upper end of the shaft is a knob or finger-nut 28 secured fast thereto by a set-screw 29. The under side of the knob 28 is formed with a cylindrical recess 30 for receiving a helical wire spring 31, one end $31^a$ of the spring being held in the side of the knob 28 and the other extremity 32 anchored in the top of the boss 27. In this manner the spring 31 is held under tension so that it tends to rock the dog-lever 23 in the direction indicated by the arrow $v$, Fig. 4. Referring particularly to this view, it is to be noted that the slot 33 in the forked end 24 of the lever 23 is slightly greater in width than the key 20 which is received therein, and also that its two opposite corners are rounded at 34 and 35. This provides that when the lever 23 is held in perpendicular relation to the key 20, as shown in Fig. 4, its forked end will slide freely along the key 20. Normally, however, the lever 23 is rocked by the spring 31 in the direction indicated by the arrow $v$, Fig. 4, and the rounded ends of its slot 33 allows it to assume the position illustrated in Fig. 5, with the sides of the slot dogging or binding against the key. Under this action the slide 16 cannot be moved back toward the winding-arbor A, but on the other hand it is free to move outwardly therefrom to accommodate the increasing diameter of the coil being wound. In other words, the dog 23 prevents the slide 16 from moving toward the axis of the coil but allows it to recede therefrom as the guide-wheel $n$ is forced back by the addition of each layer of winding. The object of this arrangement is to provide for a smoother and steadier movement of the guide-wheel $n$ in its traverse along the surface of the coil to prevent it from vibrating as it travels over the wire turns already laid in place. When it is required to set the guide-wheel $n$ adjacent the periphery of the former K at the commencement of the winding, or when it is desired to adjust it toward the coil after it has been withdrawn therefrom for inspecting the winding or for any other purpose, it is only necessary to turn the knob 28 to release the dog 23 and the slide 16 is then free to be slid in its guideway on the plate 9.

As before stated, the vertical bracket 2 which supports the guide-plate 9 for the slide 16 is mounted on the front of the traverse-slide or carriage L. The carriage L is provided with inwardly-projecting runners 36, see Fig. 2, adapted to fit around the sides of a pair of rails 37 which form a horizontal track extending longitudinally of the bed B. The rails 37 are supported at the ends of two arms 38, 39, see Fig. 9, which project outwardly from the front of the bed B and form with the tracks 37 an open-front, boxlike casing or shelf. Rotatably mounted in bearings in the arms 38, 39 is the traverse-screw or feed-shaft O which imparts movement to the carriage L and the wire-guide T carried thereby. Referring still to Fig. 9, the screw-shaft O rotates in a bushing 40 held in the left-hand arm 38, while its right-hand end is reduced in diameter at 41 and extends through a bearing 42 on the arm 39. A washer 43 is arranged between the shoulder on this end of the shaft and the side of the bearing 42, and a nut 44 on the opposite side of the bearing is held in place by a check-nut 45 screwed onto the end of the shaft. Through this arrangement the washer 43 and nut 44 take the end-thrust of the shaft O in either direction to hold it from longitudinal displacement.

The carriage or traverse-slide L is connected to be traversed from the shaft or screw O through a novel arrangement of means which provides for giving it an increment or decrement of movement over that imparted to it by the shaft. The screw O is driven intermittently from a ratchet-mechanism which is rotated in alternately-opposite directions in the manner as later described, the ratchet being adjustable to regulate the extent of feed of the guide at each advance along the winding-mandrel. In some cases a more minute adjustment is required than can be attained by setting the ratchet-mechanism to rotate a distance as determined by the length of its teeth, and in such event the present supplemental adjustment is utilized in the manner as fully explained hereinafter. This latter adjusting-means, as before mentioned, forms a part of the connections between the slide L and screw O and the arrangement of its mechanism will now be described:

Referring particularly to Figs. 2, 9 and 10, a traveling nut or follower P, fitted to the threads of the screw O, is formed on its front with a spline or key 48 engaging a horizontal slot 49 in the vertical face of the carriage L. The nut P is thus held from turning on the screw-shaft O but is free to slide longitudinally of the slot 49 under the control of a shifter-arm or bar 50. The bar 50 is fitted to a vertical slot 51 in the rear face of the carriage L and projects downwardly therebelow for connection with a horizontal track or rail R, see Fig. 9. At the lower end of the bar 50 is a shoe or runner 52 embracing the rail R, as shown in Fig. 2, and connected to the bar by a pin 53. At the upper end of the bar 50 is a stud or pin 54 carrying a roller 55 which engages an inclined slot or cam groove 56 in the front face of the nut P. Through this connection, when the shifter-arm 50 is slid up or down in its slot 51 in the carriage L the latter will be displaced horizontally to the right or left, respectively, in relation to the nut P. This vertical motion is imparted to the shifter-bar 50 from the rail R which may be inclined in either direction at an angle to the horizontal. As shown in Figs. 2 and 9 the rail R is supported at its ends from two angle-shaped brackets 57, 57 bolted to the bottom of the lower, fixed, horizontal track 37. The vertical arms of the brackets 57 are formed with arcuate slots 58 which receive bolts 59 projecting from the ends of the rail R and secured in place by nuts 60 at their ends. By loosening the nuts 60 the rail R may be adjusted at any angle desired for regulating the vertical displacement of the shifter-bar 50 whereby the feed of the carriage L is regulated in the manner as more fully explained hereinafter.

Referring now to Fig. 1, the screw-shaft O extends to the left through a bearing in the side of a casing or gear-box U and is connected to be driven from a stud-shaft O' arranged in axial alinement therewith. The shaft O' is journaled in a bearing 62 at the left-hand end of the gear-box U and is supported at its opposite end in a bearing 63 formed at the end of an arm 64 reaching in from the side of the box. On the arm 64 is a second bearing 65 which supports one end of a countershaft 66, journaled at its opposite end in a bearing 67 on the side of the box U. At the end of the stud-shaft O' is a gear 68 keyed thereto and formed on its side with a lug 69 which adapts it to serve as the male member of a clutch, the female member 70 thereof being fast on the end of the screw-shaft O and provided with a cross-slot 71 for receiving the lug 69. Through this arrangement the shafts O and O' may be connected to rotate at the same speed, but in some instances it is required to vary the speed between the driving-shaft O' and the screw O, and for this purpose I employ a train of change-gears as next described: The gear 68 meshes with a gear 72 keyed to the countershaft 66 and at the right-hand end of the latter are two gears 73 and 74 connected by a hub. The gears 73 and 74 are keyed to the countershaft 66 but are adapted for adjustment longitudinally thereof to bring one or the other respectively into mesh with two gears 75 and 76 on the shaft O. With the clutch or coupling 70 connected as illustrated in Fig. 1, the two shafts O, O' will rotate as one, with the shaft 66 running idle; but when it is desired to change the speed-ratio between the shafts the clutch-member 70 is slid to the right to disengage it from the gear 68. One or the other of the change-gears 73, 74 is then engaged with its appropriate gear 75 or 76 on the shaft O, and the latter will thus receive its rotation from the shaft O' through the countershaft 66 with a variation in speed therefrom in accordance with the ratio of the gears engaged.

The shaft O' is driven intermittently from a ratchet-mechanism, before referred to, operated from the winding-spindle S, which latter may be considered the main drive-shaft of the machine. The spindle S is connected with the source of power, which may be an electric motor or other prime-mover, through suitable belts, gears or similar transmission elements not herein shown or described. On the outer end of the spindle S is a face-cam V, see Figs 1 and 6, which is connected to oscillate a rockable lever 80. The lever 80 carries a roller 81 engaging the groove 82 in the cam V and at its lower end is connected by a stud 83 to a reciprocable slide or shoe 84. The shoe 84 is formed to embrace the sides of a horizontal rail or track 85 on which it slides, and is connected to oscillate two arms 86 and 87 pivoted on the shaft O' and carrying pawls 88, 89 which engage a ratchet-wheel 90 fast on said shaft, see Figs. 1 and 12. As shown in Fig. 6, the lever 80 is mounted to slide in a rockable bearing 91 which serves as its fulcrum while providing for a straight-line movement of its lower end as the shoe or slide 84 follows its track 85. The bearing 91 is pivoted on a stud 92 projecting from the arm of a bracket 93 which is arranged for vertical adjustment to shift the fulcrum of the lever 80. The bracket 93 is supported on a vertical standard 94 which is formed with a slot 95 engaged by a key 96 on the rear face of the bracket to prevent the latter from turning. Extending down through a bearing 97 at the top of the standard 94 is a screw-shaft 98 which is threaded through a hub or bearing 99 on the bracket 93. The shaft 98 carries a hand-nut or knob 98ᵃ at its upper end by means of which it may be turned to raise or lower the bracket 93 on its standard 94. A bolt 100 reaches from the back of the standard 94 through its slot 95 and through a hole in the bracket 93. On its front end is a nut 101 which may be tightened against the bracket 93 to clamp the latter in place on the standard 94. When the nut 101 is loosened the bracket 93 may be adjusted in vertical position by means of the hand-screw 98 to raise or lower the fulcrum point of the lever 80, and through this means the length of stroke of the lever may be varied to regulate the range of action of the ratchet-operating pawl-arms 86 and 87. The lever-actuating cam V turns in the direction indicated by the arrow z, Fig. 6, and its groove 82 is formed concentric with its axis for a short distance at 102. When the roll 81 travels through this portion 102 of the groove the lever 80 will have a slight dwell with the slide 84 at the outer end of its stroke. From this point the groove 82 swings outwardly toward the periphery of the cam in an eccentric curve 103, reaching the high point at 104. As the roller 81 follows through this portion of the groove the lever 80 will be rocked with a relatively slow movement to carry the slide 84 to the right as viewed in Fig. 6. From the point 104 on the cam V the groove 82 is continued in a concentric curve 105 to a point 106, whence it bends sharply toward the axis of the cam in the portion 107. It will thus be seen that after the roller 81 reaches the point 104 the lever 80 will remain at rest for a brief period with the slide 84 at the right-hand end of its travel. As soon, however, as the roller enters the inwardly turned section 107 of the groove 82, at the point 106, the lever 80 will be rocked on its return movement to carry the slide 84 to the left at an accelerated rate of speed. In this way the slide 84 is caused to be moved slowly to the right, where it pauses for an instant, and is then returned quickly to the left where it has a shorter interval of rest. The relatively quick return movement of the slide toward the left, as viewed in Fig. 6, effects the operative stroke of the pawl-arms 86 and 87 in the manner and for the purpose as more fully explained hereinafter.

As before mentioned, the pawl-arms 86 and 87 are pivoted on the shaft O', and as illustrated in Fig. 12, the lower arm 87 has a hub 110 offset from the plane of the arm and journaled on the hub 111 of the arm 86, see also Fig. 14. To secure a smoother movement of the pawl-arms and to prevent them from overreaching the limits of their throw, due to backlash, a friction-brake is provided between them. This consists of a sheet-metal plate-member 112, see Fig. 12, secured to the upper arm 86 by the screws 113 and formed with a circular brake-shoe 114 which partly surrounds the hub 110 of the arm 87. The brake-shoe 114 is preferably lined with a strip of fibre or leather 115 which serves to create a slight frictional resistance to the movement of the arms as they oscillate in opposite directions, and in this manner the momentum of the parts is prevented from causing an overthrow of the arms due to play or backlash in the connections. The ratchet-wheel 90 which is operated from the pawl-arms 86 and 87 is also preferably frictionized to resist its movement and prevent overrunning or reverse rotation. As shown in Fig. 14, the hub of the wheel 90 is fitted to a shouldered portion of the shaft O' and held rotatively therewith by a key 117. Held against its outer, vertical face is a dished yoke or brake-member 118 provided with a contact-washer 119 constructed of leather, fibre or other friction-producing material. The yoke 118 is mounted on two studs 120 screwed through bosses on the end of the casing U and secured in place by check-nuts 121. The inner ends of the studs 120 are reduced in diameter and fitted to holes in the yoke 118 with springs 122 coiled around them and held under tension between the side of the casing U and the face of the yoke. The studs 120 support the yoke 118 in position while holding it from turning, and the springs 122 act to press its friction-washer 119 against the face of the ratchet-wheel 90 to resist the movement of the latter. The end thrust of the yoke 118 is taken by a disk 77 pinned to the shaft O' at 78 and having a fibre washer 79 bearing against another washer 77ª abutting the web 64 of the casing U, see Figs. 11 and 12.

Referring still to Fig. 14, on the outer end of the shaft O' is a crank-handle 123 through which the shaft and its connected traverse-screw O may be turned by hand to adjust the position of the wire-guide T at the start of the winding or as occasion requires. The hub 124 of the crank 123 is free to turn on the shaft O' but may me connected rotatively therewith by sliding it inwardly to engage a cross-pin 125 with a slot 126 formed in the end of the shaft. Normally, the crank 123 is maintained free on the shaft O', to prevent it from rotating therewith, by means of a coiled spring 127 tending to slide its hub outwardly. A screw 128 in the hub engages a peripheral groove 129 on the shaft O' to limit the throw of the crank 123 under the action of its spring.

Referring now particularly to Figs. 6, 7 and 8, the pivoted pawl-arms 86 and 87 are rocked from the movement of the slide 84 through an ingenious arrangement of connecting-mechanism which provides for the release of the pawls 88 and 89 from the teeth of the ratchet 90 during their rearward travel thereover. On the front of each arm 86 and 87 is a rockable lever 130 pivoted thereto by a stud 131, see also Fig. 12. The outer end of the lever 130 is forked at 132 to adapt it to embrace the sides of a rockable cam-arm 133, as shown most clearly in Fig. 7. The cam-arm 133 is formed on the end of a pivot-pin or stud 134 which is rotatable in bearings at the outer end of the arm 86, it being understood that the construction of both arms 86 and 87 are identical and therefore only one will be described. Preferably the extremity of the arm 86 is provided with an opposite, overhanging lug 135 through which the pin 134 extends and between these two parts of the arm is the pawl 88. As shown in Figs. 7 and 12, the pawl 88 is formed with a split hub 136 surrounding the pivot-pin 134 and secured fast thereon by means of a binder-screw 137. Projecting downwardly from the hub 136 is a toe 138 provided with a sharpened end adapted to engage the teeth 139 on the ratchet 90. The pawl-arms 86 and 87 are connected to be rocked from the movement of the slide 84 by two links 140. As shown in Fig. 6, each link 140 is constructed in the form of a rod having one end screwed into a hub or block 141, pivoted on a stud 142 projecting from the side of the slide 84. At the opposite end of the rod 140 is a similar block 143 with suitable check-nuts 144 to provide for locking the rod from turning in its blocks while also allowing the length of the link to be varied by screwing the link into or out of the end-blocks in a manner similar to the adjustment of turnbuckles. The right-hand end-blocks 143 are pivoted on studs 145 which project from the sides of the levers 130. It will be observed that the links 140 connect the slide 84 with the pawl-arms 86 and 87 through the medium of the levers 130 pivoted to their sides. This provides that when the slide 84 moves in either direction it will act through the links 140 to first rock the levers 130 on their pivots 131. This movement of the levers 130 causes their forked ends 132 to act on the cam-arms 133 to rock the latter to a slight extent as limited by the engagement of the flat side of the arm with the side of the fork. In this way the pawls 88 and 89 are rocked to either engage them with or disengage them from the teeth 139 on the ratchet 90. After the pawl 88 or 89 on either arm 86 or 87 is rocked to this extent as defined by the engagement of the cam-arm 133 with the fork 132 of the lever 130, then the motion of the links 140 will be communicated through the levers 130 to rock the main arms 86 and 87. Referring to Fig. 7, this action of the link 140 on the arm 86 is as follows: Considering the arm 86 to be at the left-hand end of its throw, the initial movement of the link 140 to the right to reverse the throw of the arm will first rock the lever 130 to lift the pawl 88 away from the periphery of the ratchet-wheel 90. Stated briefly, the link 140 first rocks the lever 130 to the right on its pivot 131 and the fork 132 at the end of said lever acts on the cam-arm 133 to rock the pivot-pin 134 to lift the toe of the pawl away from the teeth 139 on the periphery of the ratchet 90. After the pawl has been lifted to the extent shown in Fig. 7, the lever 130 is restrained from further movement on its pivot 131 and hence the whole arm 86 will be moved to the right under the action of the link 140. Now, as the slide 84 reaches the right-hand end of its throw and starts to return to the left again, a reverse action is effected. That is to say, the lever 130 will first be moved on its pivot 131 relatively to the arm 86 and its forked end 132 will act against the opposite side of the cam-arm 133 to rock the pivot-pin 134 whereby the pawl 88 is carried down into engagement with the teeth 139 on the ratchet-disk 90. Then, as the movement of the slide 84 to the left is continued, the pawl 88 being engaged with one of the teeth on the ratchet 90, the effect of the movement of the arm 86 under the action of the link 140 will be to rotate the ratchet with it. In this manner the pawl-arms and their connections are so operated that when the pawls are carried back to engage with new teeth on the ratchet they are first cleared from the periphery of the ratchet-wheel so as to avoid wear on the ends of the pawl or on the teeth themselves, and in this way the whole mechanism is rendered more durable in use. This provision against wear between the engaging elements also insures a more accurate functioning of the whole machine by reducing lost motion or play.

It will be understood that only one of the pawls 88, 89 is active at a time. That is to say, when the pawl 88 on the arm 86 is operating to rotate the ratchet-wheel 90 in the direction indicated by the arrow $x$, Fig. 6, then the pawl 89 on the arm 87 is held out of range of the teeth on the ratchet; and, likewise, when the pawl 89 is released to allow it to act the pawl 88 is rendered inoperative. Through this arrangement the shaft O' and its connected traverse-screw O are rotated intermittently with a step-by-step motion, turning first in one direction throughout a predetermined cycle and then in the opposite direction to the same extent. Referring to Fig. 12, the means for controlling the alternate operation of the pawls is arranged as next described: At the right of the ratchet-wheel 90 is a shiftable disk 148 formed with a hub 149 mounted free to slide on the shaft O'. The periphery of the disk 148 is adapted to engage with suitable pawl-raising levers 150, 151 mounted fast on the ends of the pivot-studs 134. Referring to Figs. 7 and 8, the levers 150, 151 are preferably constructed of sheet-metal bent around the studs 134 and clamped thereto by means of the binder-screws 152. Each lever 150, 151 is formed with a right-angled extension or toe 153 which overhangs the periphery of the disk 148. As shown in Fig. 12, the toe 153 on the upper lever 150 is beveled at 154 on its outer end, while the toe 153 on the lower lever 151 has an opposite bevel or inclined edge 155 at its inner end. This construction provides that when the disk 148 is shifted to the left, as viewed in Fig. 12, it will engage the bevel 154 to raise the lever 150 to lift the pawl 88 out from engagement with the teeth 139 on the ratchet-wheel 90; while, on the other hand, when the disk 148 is slid to the right it will free the lever 150 and engage with the bevel 155 on the lever 151 to rock the latter to release the lower pawl 89 from the ratchet. It will thus be seen that the position of the disk 148 determines which pawl 88 or 89 shall be active while the other is inactive, the shifting of the disk being performed by instrumentalities as next described:

Formed in the hub 149 of the disk 148 is a circumferential groove 156 which is engaged by rollers 157 mounted on pins 158 projecting inwardly from the sides of a forked shifter-lever 159, see Figs. 6, 11 and 12. The shifter-fork 159 is secured fast on a rod 160 which is rockably mounted in bearings on the sides of the casing U and is operated from an arm 161 at its inner end, see Fig. 11. At the end of the arm 161 is a pin 162 engaging a slot 163 in the end of a horizontally-slidable bar 164. The bar 164 is shifted longitudinally from positively-operated means controlled by the shifting of a second parallel bar 165 arranged adjacent and abutting its front face. The bars 164 and 165 slide in slotted bearings 166, 167 formed in the web 64 and the end of the casing U. At its right-hand end the bar 165 carries an arm 168 secured thereto by the screws 169 and reaching forwardly and upwardly therefrom for attachment to a parallel rod 170. The rod 170 is shouldered at its end and inserted in a hub 171 on the arm 168, with a nut 172 screwed onto its extremity to hold it in place, see Figs. 11 and 12. Referring to Fig. 9, the rod 170 projects through an opening 173 in the casing U and extends along the front of the bed B of the machine, at the rear of the traverse-slide or carriage L, see also Fig. 2. Its right-hand end slides in a bearing 174 mounted on the top of the upright or arm 39 and secured thereto by screws 175. On either side of the bearing 174 are thrust-collars 176, shown in Fig. 9, secured to the rod 170 by set-screws 177. Between the collars 176 and the sides of the bearing 174 are compression-springs 178 coiled around the rod and tending to maintain it in neutral position. Adjustable along the rod are two contact-collars 179, 180 secured in place by set-screws 181. The collars 179 and 180 are adapted to be engaged by an arm 182 reaching inwardly from the carriage L, see Figs. 2 and 9, and surrounding the rod 170 at its end to serve as an auxiliary bearing therefor.

The main shift-bar 164 is operated from the movement of a pair of reciprocating pawls 185 and 186, shown in Figs. 12 and 13. The pawls 185 and 186 are pivoted at 188 and 189 to a rockable lever 187 and extend in opposite directions in parallel relation to the top and bottom sides of the bar 164. At their outer ends they are formed with toes 190, 191 having sharpened points adapted to engage with beveled notches 192, 193 in the top and bottom edges of the bar 164. Normally, the pawls 185, 186 are withheld from engagement with the notches 192, 193 by means of control-arms or pawl-rests 194, 195. The arms 194, 195 are pivoted on screws 196, 197 screwed into the side of the forward shift-control bar 165, to adapt them to play up and down in relation thereto. Normally, the arms 194, 195 are maintained in parallel alinement with the bar 165 by means of spring-plungers 198, 199. The plunger 198 slides in a hole 200 drilled into the top of the bar 165 and beneath it is a coiled spring 201 tending to force it upwardly against a lip or ear 202 bent over from the top of the arm 194. On the bottom of the arm 194 is a lug 203 bent rearwardly to abut the under side of the bar 165, and serving as a stop to limit the upward movement of the arm under the action of the spring-plunger 198. The arm 194 is also formed with an upwardly projecting extension 204 which is bent rearwardly at the top to provide a seat for a flat spring 205 which is fastened in place by rivets 206. The free end of the spring 205 reaches downwardly and bears on the top of the pawl 185 to hold the latter against the ear 202 on the arm 194, which acts as a rest for the pawl. It will thus be seen that the arm 194 when normally maintained in its raised position by the spring-plunger 198 will act against the pawl 185 to hold the latter raised away from engagement with its notch 192 in the bar 165. To allow the pawl 185 to be carried down into engagement with the notch 192 the arm 194 must be depressed at its right-hand end, as shown in Fig. 12. This downward, rocking motion of the arm 194 is effected by the action of positively-operated means which engage with a lug 207 bent forwardly from the under side of the arm as shown most clearly in Fig. 13. It will be seen from Fig. 12 that the arrangement of the other control-arm 195 for the opposite pawl 186 is identical with that of the arm 194, except that its position is reversed. That is to say, its ear or rest 202 is on the under side of the bar 165 and the spring-plunger 199 tends to press its left-hand end downwardly to an extent limited by the engagement of its stop-lug 203 with the top of the bar 165. Likewise, its forwardly-projecting operating-lug 208 is bent over from the top of the arm to adapt it to be pressed upwardly to relieve the rest 202 from the pawl 186 to allow the latter to rock upwardly to engage the notch 193 in the bar 165. The means for operating the arms 194 and 195 will now be explained in detail:

Referring particularly to Figs. 11 and 13, the shaft O carries a hub 210 held fast thereon by means of a set-screw 211 and arranged opposite the pawl-controlling means above described. Surrounding the hub 210 are two collars 212, 213 held between a flange 214 at one end of the hub and a circular plate or washer 215 secured to its opposite end by the screws 216. The collars 212, 213 are adjustable rotatively of the hub and are split at 217, 218, see Fig. 13, to adapt them to be clamped in position thereon by means of the binder-screws 219. Projecting from the side of the collar 212 is an arm 220 formed with a flat side adapted to engage with the lug 207 on the control-arm 194 to depress the latter when the shaft O turns in the direction indicated by the arrow $x$, Fig. 13. Likewise, the collar 213 has an oppositely-shaped arm 221 adapted to engage the lug 208 on the other pawl-control arm 195 to raise the latter when the shaft O turns in the opposite direction, the method of cooperation between these parts being more fully explained hereinafter.

Referring to Figs. 12 and 13, the pawls 185 and 186 are arranged to be reciprocated horizontally, in parallel relation to the bar 194, through the oscillation of their rockable lever 187. The lever 187 is formed on the front end of a pivot-shaft 225 which is journaled in a bearing 226 in the main frame or bed B of the machine, see Fig. 13. At the rearward end of the shaft 225 is a crank-arm 227 secured fast thereon by a set-screw 228 in its hub 229. At its upper end the crank-arm 227 carries a stud 230 which engages a slot 231 in the forked end of a lever 232, see also Fig. 12. Referring now to Fig. 6, the lever 232 is pivoted on a stud 233 held in a bearing on the headstock C which surmounts the bed B. The lower arm of the lever 232 is enclosed within the base of the headstock C, but its upper arm projects upwardly thereabove toward the winding-spindle S. Referring to Fig. 1, on the spindle S is a cam Y, formed on its periphery with a helical groove $y$. The upper end of the lever 232 carries a stud 234 on which is a roller 235 engaging the groove $y$ in the cam, so that as the spindle S turns through one complete revolution the lever 232 will be rocked in both directions to the full extent of its throw. The groove $y$ is so formed as to impart a quick throw to the lever 232 as its upper end moves to the right, and a relatively slow motion in the opposite direction, and in this manner the lever 187 is oscillated to reciprocate the pawls 185 and 186. The spindle S thus serves as the prime-mover for operating the pawls 185 and 186 to slide the bar 164, whereby the disk 148 is shifted to control the ratchet-drive for the traverse-screw O, see Fig. 12. This shifting of the disk 148, however, cannot take place until the control-bar 165 has been moved into position to allow the action of one or the other of the pawls 185, 186, and the movement of the bar 165 is only effected when the wire-guide L reaches one or the other extreme of its traverse.

To assist the movement of the bar 165 and provide for a quicker action in throwing the disk 148 into position, an auxiliary wedge-pawl 236, see Fig. 12, is arranged to operate as follows: The pawl 236 is pivoted on a stud 237, screwed into the front of the frame-bed B, and at its outer end is formed with a beveled toe 238. The toe 238 is adapted to engage the beveled sides of a V-shaped tooth 239 formed on the top of the bar 164, being pressed thereagainst by a spring 240 held in a pocket 241 in the casing U and bearing on the top of the pawl 236. The initial movement of the bar 164 in either direction, under the impulse of one or the other of the reciprocating pawls 185, 186, causes the toe 238 of the pawl 236 to ride up the beveled side of the tooth 239, and immediately it passes its apex the pressure of the spring 240 will cause the pawl to act on the tooth with a wedging effect to slide the bar 164 with a quicker action. In this way the disk 148 is operated from the bar 164 to release one pawl 88 or 89 from and engage the other one with the ratchet-wheel 90 practically instantaneously so as to prevent lost motion in the operation of the ratchet.

Referring now to Fig. 11, the shifting of the disk 148 which controls the ratchet-drive for the feed-screw O may be effected manually in adjusting the machine for operation by means of a hand-lever 245. The lever 245 is formed with a hub 246 loosely mounted on the end of the shifter-fork shaft 160, and provided with a notch 247 adapted to be engaged by a cross-pin 248 in the shaft. Normally the lever 245 hangs pendant with its hub free on the shaft, but by sliding it forward the notch 247 is engaged with the pin 248 so that the shifter-fork 159 may be rocked in either direction as required to slide the disk 148. Through this means the direction of traverse of the wire-guide may be reversed so as to allow it to be moved to either end of its throw without requiring it to be carried throughout its full traverse to the opposite end, the purpose of this arrangement being to expedite the adjustment of the machine in preparing it for operation.

In order, however, that the synchrony of operation of the several units in the mechanism of the machine shall not be disturbed or disrupted, an automatic lock is provided to prevent manual shifting of the ratchet-control disk 148 except when the parts have a certain corelation. Referring to Figs. 1 and 6, at the left-hand end of the machine is a stop-lever 250 pivoted on a stud 251 screwed into the side of the headstock C. The upper arm of the lever 250 carries a roll 252 pivoted on a stud 253 and arranged to bear on the periphery of the ratchet-operating cam V. A spring 254 secured at one end to the lever 250 and anchored at its opposite end to a pin 255 driven into the side of the headstock C acts to maintain the roll 252 bearing constantly against the cam. At the end of the lower arm of the lever 250 is a curved hook or toe 256 arranged to project through an opening in the side of the casing U to bring it into proximity with the edge of the disk 148. The cam V is formed with a slight depression 257 extending throughout substantially 90 degrees of its circumference and as the roll 252 rides on this portion of the cam it allows the lever 250 to rock so that its toe 256 will be in position on either one side or the other of the disk 148 to prevent the latter from being shifted. The depressed portion 257 of the cam V is arranged diametrically opposite the portion 107 of its groove 82 which effects the operative stroke of the pawl-arms 86, 87. Therefore, when the cam V is turning through that part of its revolution in which it is operative to actuate the pawl-arms 86, 87 to rotate the ratchet-wheel 90, the lever 250 will be in position to prevent the manual shifting of the disk 148. When, however, the cam has turned beyond this point and the pawl-arms 86, 87 are being returned to position with their pawls inoperative, then the roll 252 rides on the outer periphery of the cam V and the lever 250 will be held with its toe withdrawn from the side of the disk 148 to allow the latter to be shifted in either direction. Through this arrangement the reversing of the traverse of the wire-guide is prevented except at such times as the ratchet-drive is inoperative. The purpose of this is to prevent the reversal of the parts at a time when they have only partly performed their operation, in which case their proper corelation would be disturbed.

The construction and arrangement of the several mechanisms of the machine having now been described in detail, the method of operation of the complete apparatus will next be explained: As before stated, the machine is designed for winding electrical coils and particularly for producing relatively large coils of heavy wire. It is also to be noted that a particular object of the invention is to provide the machine with an intermittently-operated traverse, or, in other words, a step-by-step progression or feed of the wire-guide in its movement along the winding-arbor. In machines for winding relatively small coils the wire-guide is given a continuous traverse, back and forth along the mandrel, and the turns of the wire are therefore laid in spirals or helices extending from one end of the coil to the other with a slight lead similar to the pitch of a screw-thread. In the style of winding performed by the present machine the wire turns are laid perpendicular to the axis of the coil or, in other words, the wire is disposed in concentric, parallel turns lying side by side at right-angles to their axis without pitch or lead therealong. With this method of winding, as each turn of the wire is completed, that is, as it is laid around a full circumference, its guiding point must be shifted to a new position to dispose it in the next adjacent turn. To provide for this the wire-guide which feeds the wire into place on the coil is held fixed while the winding-mandrel makes one revolution, but just as this first revolution is being completed it is shifted quickly one way or the other along the mandrel to guide the wire into place for the next turn. This successive shifting of the guide constitutes what has been termed an intermittent traverse or feed, and the extent of each shifting movement of the guide is equal to the thickness or diameter of the wire being wound. It now being understood what method of winding is required of the machine, the complete operation of its elements will next be explained:

To prepare the machine for winding the mandrel A is first removed by withdrawing it from the chuck G, after the spindle S' has been slid out of the way. A former or core K of suitable size and shape, in accordance with the type of coil to be produced, is next secured in place on the mandrel and the latter is then mounted in the machine with its end connected to the winding-spindle S as shown in Fig. 1. The wire-guide T must now be set at one end of the mandrel K with the guide-wheel n close to the side of the flange k and this is accomplished by turning the feed- or traverse-screw O through the means of the crank-handle 123. Referring to Fig. 14, the handle 123 is first slid to the right to engage the pin 125 in its hub 124 with the slot 126 in the end of the shaft O' so that the latter may be turned therefrom, and as before explained the shaft O' is connected to rotate the feed-shaft O. When the pawl-arms 86 and 87, shown in Fig. 6, are inoperative, with their pawls 88 and 89 lifted away from the teeth on the ratchet-disk 90, the shaft O' can be turned in either direction as most convenient to feed the traverse-slide L and the wire-guide T to the desired point. If either one of the pawls 88 or 89 should be in operative position when the machine stops, however, that is to say if one of the pawls is engaged with the teeth on the ratchet 90, then it will prevent the shaft O' from being rotated in one direction but it may be turned the opposite way, in which case the guide T must sometimes be carried to the further end of its travel before being brought back to the starting point. Furthermore, if either of the pawls 88, 89 is in engagement with the ratchet the traverse of the guide cannot be reversed by shifting the disk 148. That is to say, when the pawl-operating cam V is in such position that one of the pawl-arms 86, 87 is at the feeding point in its stroke the stop-lever 250 will be held in the position shown in Fig. 6 and therefore the disk 148 cannot be shifted in either direction. This precaution is necessary to prevent reversal of the pawls 88, 89 should one of them have been moved through only a portion of its feeding stroke. The reversal of the pawls at such a juncture would cause feeding of the ratchet 90 back in the opposite direction before its full movement in the first direction had been completed, and such action would disrupt the coordination between the spindle S and shaft O. Stated briefly, the shaft O must maintain a certain definite relation to the spindle S as regards their rotative positions in order to effect the shifting of the traverse of the wire-guide T at the proper intervals, and this synchrony of operation between the parts must not be disturbed. In other words, the ratchet-device must be carried through a complete cycle in its operation before being reversed, and the stop-lever 250 prevents reversal except at proper intervals.

After the wire-guide T has been set at the starting point of its traverse through the manual turning of the feed-screw O, the length of its feed-advance is regulated in accordance with the thickness of the wire being wound by adjusting the throw of the ratchet-operating lever 80. Referring to Fig. 6, the fulcrum of the lever 80 is either raised or lowered by turning the screw 98 after the lock-bolt 100 has been released. The lever 80 is set to advance the ratchet 90 at each stroke through such a portion of its circumference as will turn the feed-screw O sufficiently to feed the wire-guide T at a distance equal to its thickness or diameter. After the slide 93 has been adjusted to proper position to thus regulate the throw of the lever 80 the clamping-bolt 100 is tightened again and this part of the mechanism requires no further attention until a different size of wire is to be wound on the machine. It will be obvious that the adjustment of the throw of the lever 80 regulates the distance through which the pawls 88, 89 travel in moving back to engage a new tooth on the ratchet 90, and consequently the accuracy of this adjustment is dependent to some extent upon the fineness of the teeth on the ratchet. In other words, the range of adjustment of the lever is defined by units of distance equal to the spacing between the teeth. For practical reasons based upon manufacturing limitations it is inadvisable to construct the ratchet with extremely fine teeth, and hence the adjustment of its throw in some instances may not be as minutely accurate as required to provide the exact feed desired. For this reason it has been found expedient to provide an auxiliary adjusting-means to further regulate the extent of feed of the wire-guide and the method of operation of this device has already been explained in detail. Suffice it to state here that after the lever 80 has been adjusted as closely as possible to give the desired feed to the wire-guide any further adjustment that may be necessary is made by raising or lowering one end of the rail R shown in Fig. 1. This causes the vertical bar 50 to be shifted one way or the other as the slide L feeds along the screw O, and the slide will therefore be correspondingly displaced in relation to its feed-nut P, whereby the wire-guide carried by the slide will be given an increment or decrement of motion during its feed from the screw.

The next adjustment required is to regulate the full extent of traverse of the wire-guide T, or in other words, its point of reversal of travel along the feed-screw O.
As before explained the feed of the guide T is reversed by the shifting of the control-bar 165 under the action of the sliding rod 170, see Figs. 9, 11 and 12. The rod 170 is shifted through the engagement of the arm 182 on the slide L with the collars 179 and 180, see Fig. 9. These collars are adjusted on the rod 170 in such position that as the slide L approaches either end of the traverse required for the full length of the coil it will make contact with one or the other of them to slide the rod to an extent sufficient to shift the bar 165 to bring one of the pawl-rest arms 194, 195 into position to be acted upon by its striker-arm 220 or 221, see Figs. 12 and 13, the cooperation of these parts being more fully explained hereinafter.

After the above described adjustments have been completed the wire to be wound into the coil is applied to its guide T in the manner as next explained: Referring to Fig. 2, the wire w is led from its source of supply, generally arranged at the rear or under the machine, but not here shown, first around the lower guide-pulley l, and then up over the wheel m and finally over the main guide-wheel n to the winding-mandrel A. After the end of the wire has been suitably attached to the former or core K, the guide-wheel n is set up against the core K by sliding the slide 16 inwardly on its support 9. To accomplish this the dogging-lever 23, shown in Figs. 3, 4 and 5, must first be released from the spline 20 and this is effected by turning the knob 28 to hold the lever in the position illustrated in Fig. 4. When so operated the lever 23 releases its grip on the spline 20 and the slide 16 may be moved freely in its guideway 14 in the plate 9. After the guide-wheel n has been set with its rim contiguous to the periphery of the core K on which the coil is to be wound the dogging-device is released and the machine is then ready to operate.

Power is applied to the spindle S to rotate the latter through any suitable means such as by belts, gears or other driving-connections which are not herein shown as they may be of any usual arrangement. At the start of the winding the spindle S is turned to the position shown in Fig. 6, a hand-wheel Q illustrated in Fig. 1 being employed for this purpose. With the spindle S in this position the roll 81 on the ratchet-operating lever 80 will be at the "low" point of the groove 82 in the cam V and the first stroke of the lever will therefore be in a direction to carry the pawl-arms 86 and 87 back through the inoperative part of their throw. The object of starting the machine at this point is to insure the laying of a turn of wire w throughout the whole circumference of the core K, closely adjacent its end-flange k, before shifting the point of feed of the wire. That is to say, the first revolution of the winding-spindle S will cause the wire w to be laid onto the core K against the side of the end-flange k, with the first turn disposed at right-angles to the axis of the core. As the spindle S turns in the direction indicated by the arrow z, Fig. 6, the roll 81 on the lever 80 travels first through the concentric portion 102 of the cam-groove 82, while the lever makes a slight dwell, and then as the roll rides outwardly in the groove-section 103 the upper end of the lever 80 will be rocked to the left. This movement of the lever 80 continues until the roll 81 reaches the "high" point 104 on the cam V, at which juncture the slide 84, attached to the lower end of the lever, will have been moved to the full extent of its throw toward the right. During this displacement of the slide 84 its connecting-rods 140 will act to first tilt the forked rocker-levers 130 on the pawl-arms 86 and 87 to raise both pawls 88, 89 away from the periphery of the ratchet-disk 90, and the continued movement of the slide will then cause the arms 86, 87 themselves to be rocked on the shaft O' in the direction opposite to that indicated by the arrow x, Fig. 6. From the "high" point 104 of the cam-groove 82 the roll 81 passes into the outer, concentric portion 105 of the groove and during the period of its travel therethrough the lever 80 will remain at rest for a slight interval. At this point the slide 84 is at the right-hand end of its throw and the arms 86 and 87 are therefore back in position to pick up the ratchet 90 to turn it in one direction or the other as governed by the control of their pawls 88, 89, through the disk 148. With the wire-guide T in the position illustrated in Fig. 1, at the start of the winding, its direction of feed will be first to the right, and to secure this the feed-screw O which, as shown, has a right-hand thread must be turned to the left, or in the direction indicated by the arrow x, Fig. 6. To provide for this left-hand turning movement of the ratchet 90 the pawl 88 on the arm 86 must become operative first and therefore the control-disk 148 must be at the right-hand position of throw, as shown in Figs. 1 and 12, with its periphery beneath the toe 153 of the lower pawl-raising lever 151 and released from the upper lever 150. Through this corelation of the parts the pawl 89 on the arm 87 is held out of action while the pawl 88 on the arm 86 is free to operate. Now, as the roll 81 on the lever 80 travels from the point 106 on the cam V inwardly toward its axis, that is through the portion 107 of the groove 82, the lever 80 will be rocked to move the slide 84 to the left as viewed in Fig. 6. This action causes the two arms 86 and 87 to be rocked toward each other, the upper arm 86 on which the pawl 88 is operative moving to the left or in the direction indicated by the arrow $x$.

The initial movement of the slide 84 to the left causes the connecting-rod 140 to first tilt the forked lever 130 whereby it acts to rock the pivot-pin 134, through its cam-arm 133, and the toe of the pawl 88 is thus brought into engagement with one of the teeth 139 on the ratchet 90 in the manner as previously explained. The continued movement of the arm 86 will therefore cause its pawl 88 to turn the ratchet 90 to the extent determined by the throw of the lever, in accordance with its adjustment, and hence the shaft O' to which the ratchet is keyed is rotated to a like extent. The shaft O' is connected to drive the feed-screw O in the same direction, either through the clutch 70 or the change-gears shown in Fig. 1, as previously explained, and the screw O will therefore feed the carriage L through the means of its nut P to the extent required to shift the wire-guide T to alter the point of application of the wire to the winding-mandrel. As before explained, this feed of the wire-guide takes place just as the winding-spindle is completing its first revolution and hence, as the next revolution is started the wire will be laid onto the core K in a turn lying at the side of and in close juxta-position to the first turn. The machine then continues to function in the same manner with the wire-guide making a slight advance along the core K at the completion of each revolution of the winding-mandrel A so that the wire is disposed in parallel turns lying side by side and at right-angles to the axis of rotation. As the wire-guide is thus advanced with a step-by-step feed the wire turns form a continuous layer with a succession of cross-overs from one turn to the next all lying in the same longitudinal plane. As the wire-guide T reaches a position adjacent the right-hand flange $k$ of the former K to lay the last turn in the layer contiguous thereto, it is necessary to reverse its direction of feed and this reversal takes place just as the next turn is completed.

As the wire-guide T makes its last advance to the right to lay the wire in place against the right-hand flange $k$ on the core K the arm 182 on the carriage L engages the right-hand collar 180 on the rod 170, as shown in Fig. 9, to slide the rod to the right. This sliding movement of the rod 170 causes the control-bar 165 to be shifted to the right, whereby the left-hand pawl-rest or arm 194 is brought into position to cause its lug 207 to be engaged by the striker-arm 220 carried by the collar 212 on the shaft O. Normally, with the shift-rod 170 in its neutral position, as maintained by the opposed springs 178, the two arms 220, 221 which project from the collars 212, 213 pass between the lugs 207, 208, see Fig. 11, during the rotative movement of the shaft O. When, however, the lug 207 moves into position to be engaged by the arm 220, as shown in Fig. 13, and above explained, the rotative movement of the shaft O under the action of the ratchet-drive will cause the pawl-rest 194 to be depressed against the action of its spring-plunger 198. This releases the pawl 185 to allow it to be acted upon by its spring 205 to engage its toe 190 with the notch 192 in the rear shift-bar 164, as shown in Fig. 12. It is to be understood, however, that at the moment of its release the pawl 185 is not in position to engage the notch 192, but on the contrary is being moved back to such position. It has before been explained that the two pawls 185, 186 are reciprocated longitudinally of the bar 164 from the oscillation of the rocker-lever 187 on which they are pivoted. The lever 187 is rocked from the lever 232 under the action of the cam Y on the spindle S and the groove $y$ in the cam is so formed as to impart a relative slow movement to the pawl 185 during its inoperative stroke to the right and a quick throw in its stroke to the left. The cam Y is also so timed with the ratchet-drive operating-cam V, see Fig. 6, that the pawl 185 is only shifted to the left after the lever 80 has finished its stroke to feed the ratchet 90 ahead and is being carried back to pick it up again. This provides that the pawls 185 and 186 cannot become operative until after the ratchet 90 has been given its full extent of rotation to turn the screw O to advance the wire-guide T. In other words, the operative stroke of the pawls takes place as the lever 80 is being rocked into position to return the arms 86, 87 to the right for their next feeding-stroke, the release of one of the pawls 185, 186 taking place during this period. Meanwhile, the spindle S makes another revolution and therefore the first turn of the next layer of wire is laid on over the last turn of the first layer. As the pawl 185 is carried slowly back to the right its toe 190 drops into the notch 192, as shown in Fig. 12. Now, as the pawl 185 is given a quick movement to the left under the action of the cam Y it will act to slide the main shifter-bar 164 in the same direction. As the bar 164 is slid to the left the beveled toe 238 on the pawl 236 rides over the tooth 239 on the bar, tending to quicken the movement of the latter and also acting as a detent to maintain the bar in its shifted position. The bar 164 is connected with the arm 161 which operates the shifter-fork 159, see Fig. 11, and this latter will therefore be rocked to slide the pawl-control disk 148 to the left. As the disk 148 is moved in this direction its periphery will ride up the incline 154 on the toe 153 of the upper pawl 150, see Fig. 12, to lift the latter to hold the pawl 88 away from the teeth on the ratchet 90. On the other hand, as the disk rides off onto the bevel 155 of the toe 153 on the lower pawl-lever 151 the latter is released to allow its pawl 89 to be carried into engagement with the teeth on the ratchet. In this manner the upper pawl 88 on the arm 86, see Fig. 6, is now rendered inoperative while the lower pawl 89 is made active. Therefore, at the next operative stroke of the lever 80, as the arms 86 and 87 are moved toward each other to the left, the pawl 89 will come into action to turn the ratchet 90 to the right or in a direction opposite to that indicated by the arrow $x$, Fig. 6. As the ratchet turns in this direction the feed-screw O is rotated to feed the wire-guide T back toward its starting point with intermittent advances in its traverse in the manner as first explained. At the first turn of the shaft O to the right the striker-arm 220 is released from the lug 207 on the pawl-rest 194, see Fig. 13, and consequently the latter will be raised again by its spring-plunger 198 to hold the pawl 185 away from engagement with the notch 192 in the bar 165.

Now, as the guide T feeds back to the left, when it reaches its starting point again the same cycle of operations is carried out by the traverse-reversing devices except that they act in the opposite direction. That is to say, the rod 170 is shifted to the left by the engagement of the arm 182 on the carriage L with the collar 179, and the control-bar 165 is likewise shifted to the left. This brings the lug 208 on the pawl-rest 195 in position to be struck by the striker-arm 221 to lift the rest and free the pawl 186. As the latter moves to the left during its inoperative stroke its toe 191 is carried into position to engage the notch 193, so that when the pawl returns to the right again it shifts the bar 164 to the right. This action causes the disk 148 to be slid to the right so that the upper pawl 88 on the arm 86, see Fig. 12, is once more released and the lower pawl 89 rendered inoperative. Hence, at the next operative stroke of the ratchet-actuating lever 80 as the pawl-arm 86 moves to the left it acts to advance the ratchet 90 in the direction indicated by the arrow $x$, Fig. 6, and the screw O is rotated in the same direction to feed the wire-guide T to the right in the manner as first described.

The machine continues to operate in this manner with the wire-guide T traversing back and forth along the winding-mandrel A in successive steps to lay the wire turns in parallel, contiguous relation. As each layer of turns is completed the guiding-pulley $n$ will be forced back from the axis of the coil, the slide 16, Fig. 2, moving back on its support 9 for this purpose. Meanwhile, the dogging-lever 23, shown in Figs. 3, 4 and 5, is maintained in position by its spring 31 to exert a frictional grip on the spline 20 to prevent movement of the slide 16 in the opposite direction, and in this way the guide T is given a smooth, even movement without vibration as the wheel $n$ slides along the coil.

In some cases it may be desired to reverse the feed of the wire-guide before the last layer of turns on the coil is completed. That is to say, if the coil is to be composed of a certain definite number of turns, this number may be approximated before the last layer is completed, and as it is desirable that the winding be finished at the point where it starts, to bring the leads out at the same end of the coil, the last few turns are laid on across the unfinished layer. In other words, the guide T must be brought back to its starting point before finishing the last layer, and this is accomplished by reversing its traverse through the means of the manual control before explained. Referring to Fig. 11, the hand-lever 245 is engaged with the shaft 160 to rock the fork 159 to shift the pawl-control-disk to reverse the action of the pawls 88, 89, it having been previously explained that owing to the provision of the automatic stop-lever 250 this shift cannot take place until after the pawls 88, 89 have completed their operative stroke, so that the synchrony of operation between the parts may not be disrupted.

Various modifications might be made in the structure and arrangement of the parts of our improved apparatus without departing from the spirit or scope of the invention; therefore, without limiting ourselves to the exact embodiment herein shown, what we claim is:—

1. In a winding machine, the combination with a rotating winding-mandrel, of a guide movable longitudinally of the mandrel and adapted to recede therefrom during the growth in the winding, means to feed the guide progressively along the mandrel with an intermittent step-by-step movement timed to cause each step to occur after one complete rotation of the mandrel, and means to reverse the direction of feed of the guide after a predetermined number of feeding-movements.

2. In a winding machine, the combination with a rotating winding-mandrel, of a guide movable longitudinally of the mandrel and adapted to recede therefrom during the growth in the winding, means to intermittently feed the guide along the mandrel in successive steps with each step timed to occur after one complete rotation of the mandrel, means to reverse the feeding-movement of the guide, and means to regulate the point of reversal of the guide in relation to its feeding-movement.

3. In a winding machine, the combination with a rotating winding-mandrel, of a guide movable longitudinally of the mandrel and adapted to recede therefrom during the growth in the winding, means to intermittently feed the guide in successive steps along the mandrel with each step timed to occur upon the completion of one rotation of the mandrel, means to adjust the extent of feed of the guide at each step, and means to reverse the direction of feed of the guide after a predetermined number of feeding-movements.

4. In a winding machine, the combination with a rotating winding-mandrel, of a guide movable longitudinally of the mandrel, means to intermittently feed the guide along the mandrel with a step-by-step movement timed to cause each step to occur after one complete rotation of the mandrel, means to regulate the extent of each feeding-movement of the guide, means to reverse the direction of feed of the guide, and means to adjust the timing of reversal of the feeding-movement.

5. In a winding machine, the combination with a rotating winding-mandrel, of a guide movable in a path parallel with the axis of the mandrel and adapted to recede therefrom during the growth in the winding, and means operated from the winding-mandrel to intermittently feed the guide with a step-by-step advance along the mandrel with each feeding-movement occurring after one complete rotation of the mandrel at a predetermined point on the circumference thereof.

6. In a winding machine, the combination with a rotating winding-mandrel, of a guide movable in a path parallel with the axis of the mandrel and adapted to recede therefrom during the growth in the winding, means for feeding the guide longitudinally of the mandrel, a ratchet-wheel for operating the feeding-means, means operated from the mandrel to rotate the ratchet intermittently to impart a step-by-step motion to the guide with each step timed to occur after one complete rotation of the mandrel, and means to reverse the direction of rotation of the ratchet to reverse the feed of the guide.

7. In a winding machine, the combination with a rotating winding-mandrel, of a guide movable longitudinally of the mandrel and adapted to recede therefrom during the growth in the winding, means for feeding the guide along the mandrel, a ratchet-wheel for operating the feeding-means, means operated from the mandrel to advance the ratchet after each complete rotation of the mandrel to cause the guide to be advanced in steps along the mandrel with each step occurring at a predetermined point on the circumference thereof, means to adjust the extent of rotation of the ratchet to regulate the distance of feed of the guide, and means to reverse the direction of rotation of the ratchet after a predetermined number of feeding-movements.

8. In a winding machine, the combination with a rotating winding-mandrel, of a guide movable longitudinally of the mandrel, a ratchet-mechanism operated from the mandrel to feed the guide in steps along the mandrel with each step timed to occur after one complete rotation of the mandrel, means to adjust the ratchet-mechanism to regulate the extent of feed of the guide, means to reverse the operation of the ratchet-mechanism to reverse the feed of the guide, and means to adjust the time of action of the reversing-means to regulate the number of feeding-movements of the guide in each direction.

9. In a winding machine, the combination with a rotating winding-mandrel, of a guide movable relatively thereto, means to feed the guide along the mandrel, a ratchet-wheel for operating said feeding-means, a rockable arm for turning the ratchet in one direction, a second rockable arm for turning the ratchet in the opposite direction, and automatically-controlled means for rendering one arm operative and the other inoperative to reverse the feed of the ratchet.

10. In a winding machine, the combination with a rotating winding-mandrel, of a guide movable longitudinally thereof, means for feeding the guide along the mandrel, a ratchet-wheel for operating said feeding-means, two rockable arms for turning the ratchet, pawls on said arms engageable with the teeth on the ratchet, automatic control-means for maintaining one pawl out of range of the ratchet while the other pawl is operative, and means to shift the pawl-control means to reverse the direction of rotation of the ratchet.

11. In a winding machine, the combination with a rotating winding-mandrel, of a guide adapted to be fed along the mandrel, means to feed the guide, a ratchet-wheel for operating the feeding-means, two arms rockable in opposite directions to turn the ratchet, pawls on said arms engageable with the teeth on the ratchet, and a disk mounted concentric with the axis of the ratchet-wheel and adapted to hold one pawl out of engagement while the other is operative, said disk being adjustable axially with respect to the ratchet-wheel to release the inoperative pawl and act on the opposite pawl to render it inoperative.

12. In a winding machine, the combination with a rotating winding-mandrel, of a guide adapted to be fed along the mandrel, and to recede therefrom during the growth in the winding, means to feed the guide, a ratchet-wheel for operating said feeding-means, a rockable arm for turning the ratchet, means for rocking the arm in alternately opposite directions, a pawl on said arm for engaging the teeth on the ratchet, and means for holding the pawl completely disengaged from the ratchet and free from its teeth during the rearward stroke of the ratchet-turning arm.

13. In a winding machine, the combination with a rotating winding-mandrel, of a guide adapted to be fed along the mandrel, means to feed the guide, a ratchet-wheel for operating the feeding-means, a rockable arm for turning the ratchet, means to rock the arm in alternately opposite directions, a pawl on the arm for engaging the teeth on the ratchet, and means actuated from the initial movement of the arm-rocking means to disengage the pawl from the ratchet as the arm is returned to position after turning the ratchet ahead.

14. In a winding machine, the combination with a rotating winding-mandrel, of a guide adapted to be fed along the mandrel, means to feed the guide, a ratchet-wheel for operating the feeding-means, a rockable arm for turning the ratchet, means to rock said arm in alternately opposite directions, a rockable pawl on the arm for engaging the teeth on the ratchet, and means operated from the initial movement of the arm-rocking means to rock the pawl into engagement with the ratchet as the arm is moved in one direction and to rock the pawl away from the ratchet as the arm moves in the opposite direction.

15. In a winding machine, the combination with a rotating winding-mandrel, of a guide adapted to be fed along the mandrel, means to feed the guide, a ratchet-wheel for operating the feeding-means, a rockable arm for turning the ratchet, a pawl pivoted on the arm to engage the teeth on the ratchet, means to rock the pawl, a lever pivoted on the arm and engaging the pawl-rocking means, and oscillating means connected to said lever to cause it to first rock the pawl into engagement with the ratchet and to then move its arm to turn the ratchet forward, said oscillating-means also operating to cause the lever to rock the pawl away from the ratchet as the pawl-arm is rocked back in the opposite direction.

16. In a winding machine, the combination with a rotating winding-mandrel, of a guide adapted to be fed along the mandrel, means to feed the guide, a ratchet-wheel for operating the feeding-means, a rockable arm for turning the ratchet, a pawl pivoted on the arm to engage the teeth on the ratchet, a cam-arm connected with the pivot of the pawl, a forked lever pivoted on the pawl-arm in engagement with the cam-arm to adapt it to rock the pawl into and out from engagement with the ratchet, and reciprocating-means connected to said lever to cause its initial movement to first rock the pawl and to then move the pawl-arm in the manner and for the purpose substantially as described.

17. In a winding machine, the combination with a rotating winding-mandrel, of a guide movable longitudinally of the mandrel, means for feeding the guide in alternately opposite directions with a step-by-step movement, means to reverse the direction of the feeding-movement of the guide, and means for preventing the operation of the reversing-means except at a predetermined point in the rotation of the mandrel.

18. In a winding machine, the combination with a rotating winding-mandrel, of a guide movable longitudinally of the mandrel, means for feeding the guide in alternately opposite directions with a step-by-step movement, means for reversing the direction of feeding-movement of the guide, means for operating the reversing means, means for preventing operation of the last named means, and means for rendering said last named means active or inactive in accordance with the position of the guide.

19. In a winding machine, the combination with a rotating winding-mandrel, of a guide movable longitudinally of the mandrel, means to feed the guide along the mandrel, means to reverse the direction of feed of the guide, and means to prevent the operation of the reversing-means except at a predetermined point in the rotation of the mandrel.

20. In a winding machine, the combination with a rotating winding-mandrel, of a guide movable longitudinally of the mandrel, means to feed the guide along the mandrel, a ratchet-mechanism for operating the feeding-means intermittently, means to reverse the operation of the ratchet-mechanism to reverse the direction of feed of the guide, and means to prevent the operation of the reversing-means when the ratchet-mechanism is in operative position for feeding the guide.

21. In a winding machine, the combination with a rotating winding-mandrel, of a guide movable longitudinally of the mandrel, means to feed the guide along the mandrel, a ratchet-mechanism for operating the feeding-means intermittently, means shiftable into position to reverse the operation of the ratchet-mechanism to reverse the direction of feed of the guide, and means for preventing the shifting of said reversing-means when the ratchet-mechanism is in operative position for feeding the guide.

22. In a winding machine, the combination with a rotating winding-mandrel, of a guide movable longitudinally of the mandrel, means to feed the guide along the mandrel, means to reverse the direction of feed of the guide, means to prevent the operation of the reversing-means except at a predetermined point in the rotation of the mandrel, and adjustable-means for effecting the operation of the feed-reversing means when the guide reaches a predetermined position in its feeding-movement.

23. In a winding machine, the combination with a rotating winding-mandrel, of a guide movable longitudinally of the mandrel, means to feed the guide along the mandrel with a step-by-step progression, means to reverse the direction of feed of the guide, means shiftable into position by the guide to cause action of the reversing-means, means to prevent the action of the reversing-means except at a predetermined point in the rotation of the mandrel, and means to adjust the position of the shiftable-means to vary the length of traverse of the guide.

24. In a winding machine, the combination with a rotating winding-mandrel, of a guide movable longitudinally of the mandrel, means for intermittently feeding the guide along the mandrel, means to reverse the direction of feed of the guide, including shiftable-means for operating the reversing-means, normally inactive means for actuating the shiftable-means, a second shiftable-means operated from the guide to render said actuating-means operative, and means to prevent the action of the reversing-means except at a predetermined point in the rotation of the mandrel.

25. In a winding machine, the combination with a rotating winding-mandrel, of a guide movable longitudinally of the mandrel, means for intermittently feeding the guide along the mandrel, means to reverse the direction of feed of the guide, means shiftable to operate the reversing-means, reciprocating-means for actuating the shiftable-means, means to render the reciprocating-means normally inoperative, and adjustable-means operated from the movement of the guide to effect the operation of the shiftable-means from the reciprocating-means.

26. In a winding machine, the combination with a rotating winding-mandrel, of a guide movable longitudinally of the mandrel, means for intermittently feeding the guide along the mandrel, shiftable-means for reversing the direction of feed of the guide, a reciprocating pawl for shifting the reversing-means, control-means for maintaining said pawl normally inactive, and means actuated from the feeding-movement of the guide to shift the control-means to release the pawl to allow it to act to shift the reversing-means.

27. In a winding machine, the combination with a rotating winding-mandrel, of a guide movable opposite the mandrel, means to feed the guide along the mandrel, means shiftable to reverse the direction of feed of the guide, two pawls reciprocable in opposite directions, to shift the reversing-means, means for holding said pawls normally inactive, and means controlled by the position of the guide to release said pawl-holding means to render one or the other of the pawls operative.

28. In a winding machine, the combination with a rotating winding-mandrel, of a guide movable opposite the mandrel, means to feed the guide along the mandrel, shiftable-means for reversing the operation of the feeding-means, two pawls reciprocable in opposite directions to shift the reversing-means, pawl-rests for holding said pawls normally inoperative, means for operating the rests to release the pawls, and means operated from the movement of the guide to shift one or the other of the pawl-rests into position to be acted upon by its operating-means.

29. In a winding machine, the combination with a rotating winding-mandrel, of a guide movable opposite the mandrel, means for feeding the guide along the mandrel, means shiftable to reverse the direction of feed of the guide, a shifter-bar for operating said reversing-means, a pair of pawls engageable with the bar to shift it in opposite directions, means to reciprocate the pawls, spring-operated pawl-rests for maintaining said pawls normally inoperative, means for operating the pawl-rests to release the pawls, and means operated from the movement of the guide to carry one or the other of the pawl-rests into position to be engaged by its operating-means.

30. In a winding machine, the combination with a rotating winding-mandrel, of a guide movable opposite the mandrel, means for feeding the guide along the mandrel, means for reversing the direction of feed of the guide, a bar shiftable in opposite directions to operate the reversing-means, a pair of reciprocating pawls adapted to engage the bar to shift the latter, means for maintaining said pawls normally withheld from engagement with the bar, a second control-bar shiftable in opposite directions to effect the release of one pawl or the other, and means adjustable longitudinally of the winding-mandrel for engagement with the guide to adapt the latter to shift the control-bar.

31. In a winding machine, the combination with a rotating winding-spindle, of a guide movable longitudinally of the spindle, means to feed the guide along the spindle, means shiftable to reverse the direction of feed of the guide, two pawls for shifting the reversing-means in opposite directions, a cam on the winding-spindle, means operated from the cam to reciprocate the pawls, controlling-means for maintaining the pawls normally inoperative, and means operated from the movement of the guide for shifting the control-means to effect the release of one pawl or the other.

32. In a winding machine, the combination with a rotating winding-mandrel, of a guide movable longitudinally thereof, a rotating screw-shaft for feeding the guide along the mandrel, means for rotating the feed-shaft, means for reversing the direction of rotation of the feed-shaft, a member shiftable in opposite directions to operate the reversing-means, reciprocable-means for shifting said member, control-means for maintaining said reciprocable-means normally inactive, and means on the feed-shaft for effecting the release of the control-means at a predetermined point in the feeding-movement of the guide.

33. In a winding machine, the combination with a rotating-winding-mandrel, of a guide movable longitudinally thereof, a rotating screw-shaft for feeding the guide along the mandrel, means to reverse the direction of rotation of the screw-shaft, means adapted to be shifted to operate the reversing-means, means on the screw-shaft for effecting the operation of said shifting-means, and means operated from the movement of the guide to bring the shifting-means into position to be operated upon by the means on the shaft.

34. In a winding machine, the combination with a rotating winding-mandrel, of a guide movable along the mandrel, a rotating screw-shaft for feeding the guide, means to reverse the motion of the screw-shaft, means shiftable into position to be acted upon by the screw-shaft to effect the operation of the reversing-means, and means adjustable into position to be engaged by the guide during its feeding movement to move the shifter-means.

35. In a winding machine, the combination with a rotating winding-mandrel, of a guide movable longitudinally thereof, means to feed the guide along the mandrel, a ratchet-mechanism for operating the feeding-means, means shiftable into position to reverse the direction of feed of the ratchet, a bar for shifting the reversing-means, reciprocating pawls engageable with the bar to shift the latter, a slidable control-bar, means on the control-bar for withholding the pawls from engagement with the shifter-bar, and means to slide the control-bar to effect the release of one of the pawls in the manner and for the purpose substantially as described.

36. In a winding machine, the combination with a rotating winding-mandrel, of a guide movable longitudinally thereof, means for feeding the guide along the mandrel, means to adjust the feeding-means to regulate the extent of feed of the guide, and means operated automatically during the feeding-movement of the guide to effect an increment or decrement of movement between the guide and its feeding-means.

37. In a winding machine, the combination with a rotating winding-mandrel, of a guide movable longitudinally thereof, means for feeding the guide along the mandrel, means for adjusting the extent of feed of the guide, and means operated automatically during the feeding-movement of the guide to displace it laterally of its feeding-means to effect an increase or decrease in the extent of feed of the guide.

38. In a winding machine, the combination with a rotating winding-mandrel, of a guide movable longitudinally of the mandrel, means for feeding the guide along the mandrel, automatically-operated means for displacing the guide laterally of its feeding-means during its feeding-movement, and means for adjusting said displacing-means to regulate the extent of increment or decrement of movement of the guide with respect to its feeding-means.

39. In a winding machine, the combination with a rotating winding-mandrel, of a guide movable longitudinally of the mandrel, a traveling feed-member for feeding the guide along the mandrel, automatically-operated means connecting the guide with its feed-member to effect a displacement therebetween in the direction of the feed, and means adjustable to operate the displacing-means during the feeding-movement of the guide.

40. In a winding machine, the combination with a rotating winding-mandrel, of a guide movable longitudinally of the mandrel, a rotatable screw-shaft, a follower engaging the screw-shaft to be fed therealong, means connecting the follower to feed the guide, and means operating on said connecting-means to displace the guide relatively to the follower during its feeding-movement to effect an increment or decrement in the extent of feed of the guide.

41. In a winding machine, the combination with a rotating winding-mandrel, of a guide movable longitudinally thereof, a rotatable screw-shaft, a follower engaging said shaft, a cam on the follower, means on the guide engaging the cam to effect a lateral displacement between the guide and follower, and means operated from the movement of the guide to actuate the displacing-means to effect an increment or decrement in the extent of feed of the guide.

42. In a winding machine, the combination with a rotating winding-mandrel, of a guide movable longitudinally thereof, a screw-shaft for feeding the guide, a follower travelable on said shaft, a cam on the follower, a member engaging the cam and slidable on the guide to effect a displacement between the guide and follower, and a track engaged by the slidable-member to move the latter during the feeding-movement of the guide.

43. In a winding machine, the combination with a rotating winding-mandrel, of a guide movable longitudinally thereof, a screw-shaft for feeding the guide, a follower on the shaft formed with an inclined cam-groove, a bar slidable vertically on the guide, means on the bar engaging the cam-groove in the follower, a shoe on the bar, a rail on which the shoe slides, and means to adjust the rail at an inclination to cause the bar to be moved therefrom during the feeding-movement of the guide to displace the guide with respect to its follower.

44. In a winding machine, the combination with a rotating winding-mandrel, of a traveling carriage movable longitudinally thereof, a guide slidable on the carriage toward and away from the winding-mandrel, a spline on the carriage, and a lever on the guide formed with a slot engaging the spline and adapted to be rocked laterally thereof to bind against the sides of the spline to resist movement of the guide in one direction while allowing it to slide in the opposite direction.

45. In a winding machine, the combination with a rotating winding-mandrel, of a carriage slidable along the mandrel, a guide slidable on the carriage toward and away from the mandrel, a spline on the carriage, a forked lever pivoted on the guide to engage the spline, and a spring to rock the lever laterally of the spline to engage its sides to prevent movement of the guide toward the mandrel while allowing it to recede therefrom.

In testimony whereof we affix our signatures.

EDWARD F. PARKS.
CARL A. BRINK.
GEORGE N. TAYLOR.